(12) United States Patent
Willassen

(10) Patent No.: US 9,041,842 B2
(45) Date of Patent: May 26, 2015

(54) IMAGE SENSOR PIXEL CELL READOUT ARCHITECTURE

(71) Applicant: OMNIVISION TECHNOLOGIES, INC., Santa Clara, CA (US)

(72) Inventor: Trygve Willassen, Oppegaard (NO)

(73) Assignee: OmniVision Technologies, Inc., Santa Clara, CA (US)

( * ) Notice: Subject to any disclaimer, the term of this patent is extended or adjusted under 35 U.S.C. 154(b) by 173 days.

(21) Appl. No.: 13/940,710

(22) Filed: Jul. 12, 2013

(65) Prior Publication Data
US 2015/0015757 A1    Jan. 15, 2015

(51) Int. Cl.
| H04N 3/14 | (2006.01) |
| H04N 5/378 | (2011.01) |
| H04N 5/374 | (2011.01) |
| H04N 5/3745 | (2011.01) |

(52) U.S. Cl.
CPC .............. *H04N 5/378* (2013.01); *H04N 5/374* (2013.01); *H04N 5/3745* (2013.01)

(58) Field of Classification Search
CPC .............................. H04N 5/374; H04N 5/378
USPC ......... 348/300–310; 438/109–110; 250/208.1
See application file for complete search history.

(56) References Cited

U.S. PATENT DOCUMENTS

| 8,294,077 B2 | 10/2012 | Mao et al. |
| 8,426,796 B2 | 4/2013 | Mao et al. |
| 2005/0218299 A1* | 10/2005 | Olsen et al. ............... 250/214 A |
| 2008/0284890 A1* | 11/2008 | Miyatake ..................... 348/308 |

* cited by examiner

Primary Examiner — Mekonnen Dagnew
(74) Attorney, Agent, or Firm — Blakely Sokoloff Taylor & Zafman LLP

(57) ABSTRACT

An image sensor includes a pixel array including a plurality of pixel cells each including a floating diffusion node, a photosensitive element coupled to selectively transfer image charge to the floating diffusion node, and a feedback coupling capacitor coupled between the floating diffusion node and an output line. A bit line is coupled to selectively readout image data output from each one of a group of the plurality of pixel cells. An integrator is capacitively coupled to the bit line. The integrator is coupled to output an output signal on the output line in response to the image data. The output signal on the output line is capacitively coupled to the floating diffusion node through the feedback coupling capacitor to suppress a potential swing at the floating diffusion node of each one of the group of the plurality of pixel cells in response to the output signal.

24 Claims, 3 Drawing Sheets

IMAGE SENSOR PIXEL CELL READOUT ARCHITECTURE

BACKGROUND INFORMATION

1. Field of the Disclosure

The present invention relates generally to image sensors. More specifically, examples of the present invention are related to circuits that readout image data from image sensor pixel cells with low supply voltage.

2. Background

Image sensors have become ubiquitous. They are widely used in digital cameras, cellular phones, security cameras, as well as, medical, automobile, and other applications. The technology used to manufacture image sensors, and in particular, complementary metal-oxide-semiconductor (CMOS) image sensors, has continued to advance at great pace. For example, the demands of higher resolution and lower power consumption have encouraged the further miniaturization and integration of these image sensors.

In a conventional CMOS active pixel sensor, image charge is transferred from a photosensitive device (e.g., a photo diode) and is converted to a voltage signal inside the pixel cell on a floating diffusion node. The image charge can be transferred efficiently from photosensitive device to the floating diffusion when the potential at the floating diffusion is higher than the pinning voltage of the photosensitive device (e.g., $V_{PIN}$). The sum of the floating diffusion voltage swing and pinning voltage typically limits the supply voltage for the active pixel sensor to a minimum of 2.5-3 Volts. However, there is a continuing demand for active pixel sensors with a supply voltage of less than 2.5-3 Volts as the demands for further miniaturization of active pixel sensors increase.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
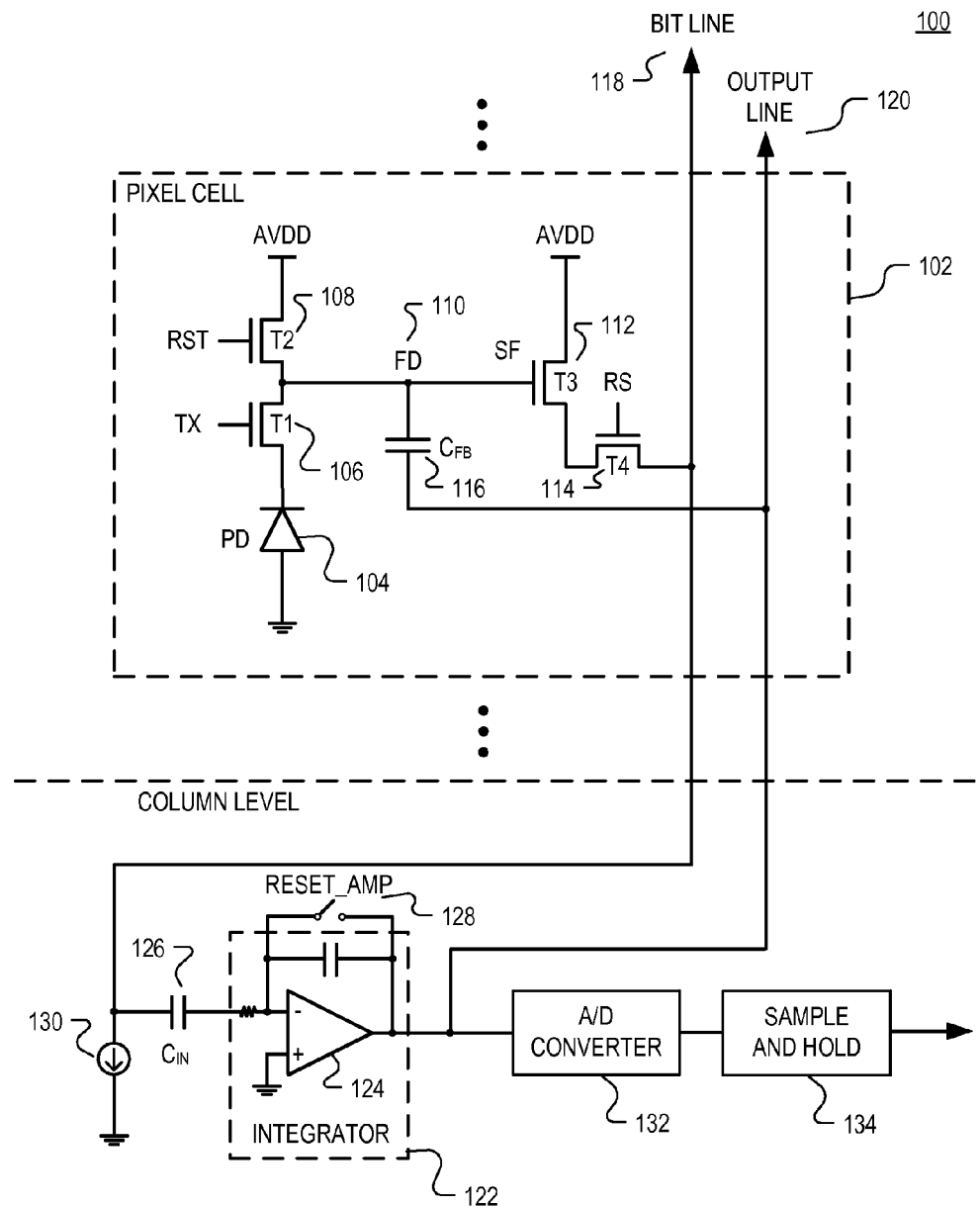
FIG. 1 is a schematic illustrating one example of an image sensor having a readout architecture that suppresses a potential swing at a floating diffusion node in accordance with the teachings of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

Examples in accordance with the teaching of the present invention describe a readout architecture that suppresses potential swings at the floating diffusion nodes of the pixel array in accordance with the teachings of the present invention. As will be shown, in various examples, a column level integrator is coupled to integrate image data that is output on a bit line from each pixel cell. In one example, the integrator drives a positive voltage step on an output of the integrator in response to a downward potential swing at a floating diffusion node, which therefore supplies supply charge to that floating diffusion node through a feedback capacitor in accordance with the teachings of the present invention. In one example, the charge that is supplied through the feedback capacitor from the output of the integrator helps to maintain a substantially constant voltage on the floating diffusion node, which is greater than the voltage on the photosensitive element. By suppressing voltage swings to maintain the substantially constant voltage on the floating diffusion node, the pixel can therefore operate at a lower supply voltage in accordance with the teachings of the present invention.

To illustrate, FIG. 1 is a schematic illustrating one example of an image sensor 100 having a readout architecture that suppresses a potential swing at a floating diffusion node in accordance with the teachings of the present invention. In the depicted example, the image sensor 100 includes a plurality of pixel cells 102 that are arranged in a pixel array. In the depicted example, pixel cell 102 is illustrated as being a four-transistor (4T) pixel cell. It is appreciated that pixel cell 100 is one possible example of pixel circuitry architecture for implementing each pixel cell within image sensor 100. However, it should be appreciated that other examples in accordance with the teachings of the present invention are not necessarily limited to 4T pixel architectures. One having ordinary skill in the art having the benefit of the present disclosure will understand that the present teachings are also applicable to 3T designs, 5T designs, and various other pixel architectures in accordance with the teachings of the present invention.

In the example depicted in FIG. 1, pixel cell 102 includes a photosensitive element, which may also be referred to as a photodiode (PD) 104 to accumulate image charge, a transfer transistor T1 106, a reset transistor T2 108, a floating diffusion (FD) node 110, an amplifier transistor, which is illustrated as a source-follower (SF) transistor T3 112, and a row select transistor T4 114. A feedback coupling capacitor $C_{FB}$ 116 is capacitively coupled between floating diffusion node FD 110 and an output line 120. During operation, transfer transistor T1 106 receives a transfer signal TX, which selectively transfers the image charge accumulated in photosensitive element PD 104 to floating diffusion FD node 110.

As shown in the illustrated example, reset transistor T2 108 is coupled between a supply voltage AVDD and the floating diffusion node FD 110 to reset levels in the pixel cell 102 (e.g., discharge or charge the floating diffusion node FD 110 and the photosensitive element PD 104 to a preset voltage) in response to a reset signal RST. The floating diffusion node FD 110 is coupled to control the gate of amplifier transistor SF T3 112. Amplifier transistor SF T3 112 is coupled between the supply voltage AVDD and row select transistor RS T4 114. Amplifier transistor SF T3 112 operates as a source-follower amplifier providing a high impedance connection to the floating diffusion node FD 110. Row select transistor RS T4 114 selectively couples the image data output of pixel cell 102 to the readout column bit line 118 in response to a row select signal RS. In the illustrated example, bit line 118 is coupled to selectively readout image data from a column of the plurality of pixel cells 102 in the image sensor 100.

The example depicted in FIG. 1 also illustrates an integrator 122 at the column level that is capacitively coupled to the bit line 118 through an input coupling capacitor $C_{IN}$ 126 as shown. As shown in the example, an output of integrator 122 is coupled to output line 120, which is capacitively coupled to floating diffusion node FD 110 through feedback coupling capacitor $C_{FB}$ 116. In the illustrated example, the capacitive coupling provided with input coupling capacitor $C_{IN}$ 126 supports different DC voltage levels between an input of integrator 122 and bit line 118, while allowing AC signals or high frequency signals to pass between bit line 118 and the input of integrator 122. Similarly, the capacitive coupling provided with feedback coupling capacitor $C_{FB}$ 116 supports different DC voltage levels between floating diffusion node FD 110 and output line 120, while allowing AC signals or high frequency signals to pass between floating diffusion node FD 110 and output line 120.

In one example, a current source 130 with high internal impedance is coupled to bit line 118 to sink current to ground as shown. In the example, a reset switch 128 is also coupled to integrator 122 as shown, which is coupled to reset levels of integrator 122 in response to a RESET_AMP signal as shown. In the illustrated example, integrator 122 includes an op amp 124 that is coupled as an integrator. As such, the inverting input of op amp 124 is coupled to input coupling capacitor $C_{IN}$ 126 and the non-inverting input of op amp 124 is coupled to ground as shown. In one example, op amp 124 may be implemented as a single branch common source amplifier to reduce die size and power dissipation.

In operation, integrator 122 is coupled to output an output signal on the output line 120 in response to the integration of the image data received from bit line 118 through the input coupling capacitor $C_{IN}$ 126. As shown in the example depicted in FIG. 1, the output signal on output line 120 is fed back to the pixel cell 102 through feedback coupling capacitor $C_{FB}$ 116. Specifically, in one example, the op amp 124 of integrator 122 drives a positive voltage step on the output line 120 in response to a downward potential swing at the floating diffusion node FD 110, which supplies charge to the floating diffusion node FD 110 through the feedback coupling capacitor $C_{FB}$ 116. As a result, the downward voltage swing on the floating diffusion node FD 110 resulting from the transfer of image charge from the photosensitive element PD to the floating diffusion node FD 110 is suppressed with the open loop gain of the op amp 124. In other words, the open loop gain of the op amp 124 is coupled to drive a positive voltage step on the output line 120 to supply charge to the floating diffusion node FD 110 through the feedback capacitor $C_{FB}$ 116 to maintain a substantially constant voltage at the floating diffusion node FD 110 above a voltage at the photosensitive element FD 104 in response to the transfer of image charge to the floating diffusion node FD 110 from the photosensitive element FD 104 in accordance with the teachings of the present invention. Thus in one example, since the voltage at the floating diffusion node FD 110 is maintained at a substantially constant voltage with integrator 122 coupled as shown, a lower supply voltage may be utilized for AVDD, such as for example approximately 1.8 Volts, in accordance with the teachings of the present invention.

In one example, the output signal on the output line 120 is also coupled to be converted form analog to digital with A/D converter 132. In one example, the output signal level on the output line 120 is also coupled to be sampled and held with sample and hold circuit 134 as shown. In one example, as will be discussed in greater detail below, the output value from the pixel cell 102 may determined by taking the difference between the sampled output level value of the output signal after the image charge is transferred to the floating diffusion node FD 110, and the sampled output level of the output signal after a reset.

Figure 2:
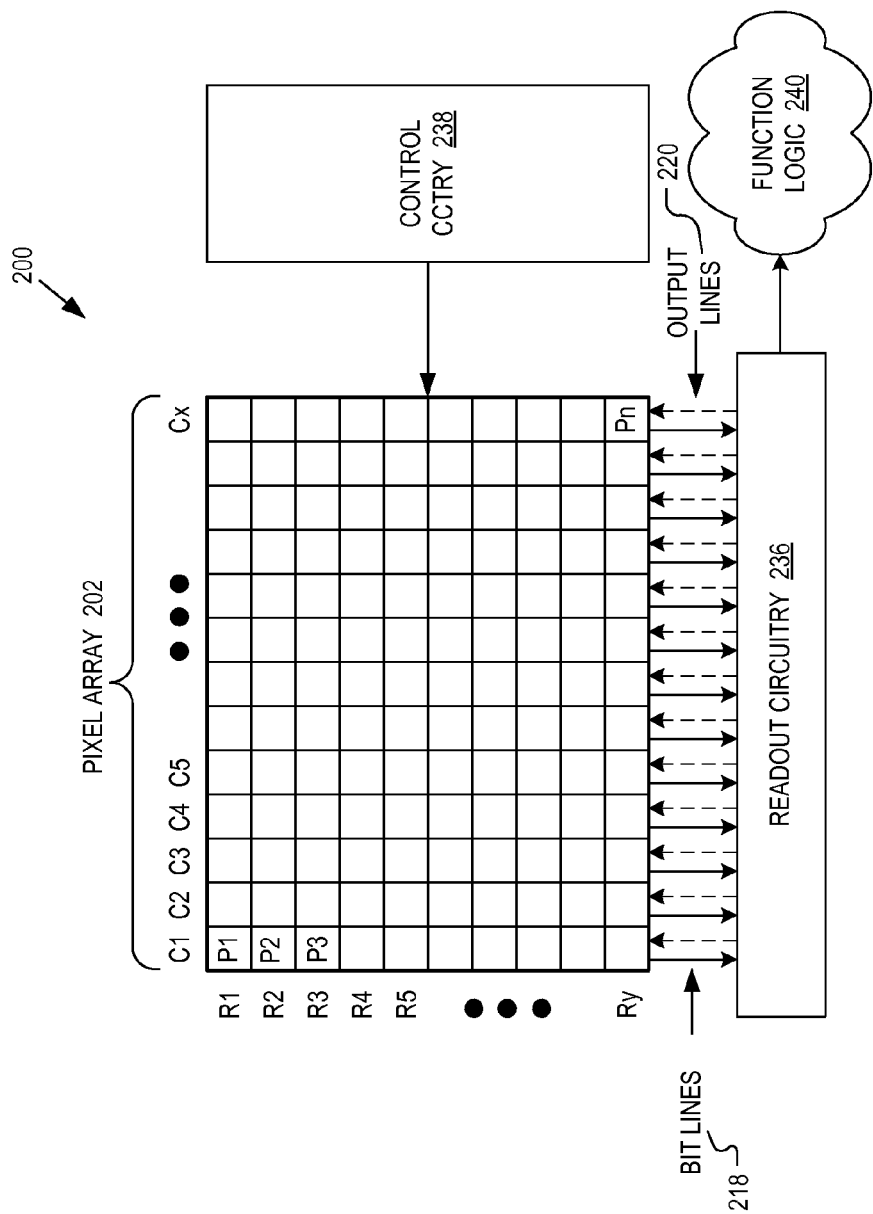
FIG. 2 is a is a block diagram illustrating an example imaging system including a readout architecture that suppresses potential swings at the floating diffusion nodes of pixel cells in a pixel array in accordance with the teachings of the present invention.

FIG. 2 is a is a block diagram illustrating an example imaging system 200 including a readout architecture that suppresses potential swings at the floating diffusion nodes of pixel cells in a pixel array in accordance with the teachings of the present invention. As shown in the depicted example, imaging system 200 includes pixel array 202 coupled to control circuitry 238 and readout circuitry 236, which is coupled to function logic 240.

In one example, pixel array 202 is a two-dimensional (2D) array of imaging sensors or pixel cells (e.g., pixel cells P1, P2 . . . , Pn). In one example, each pixel cell is a CMOS imaging pixel. It is noted that the pixel cells P1, P2, . . . Pn in the pixel array 202 may be examples of pixel cell 102 of FIG. 1 and that similarly named and numbered elements referenced below are coupled and function similar to as described above. As illustrated, each pixel cell is arranged into a row (e.g., rows R1 to Ry) and a column (e.g., column C1 to Cx) to acquire image data of a person, place, object, etc., which can then be used to render a 2D image of the person, place, object, etc.

In one example, after each pixel cell has accumulated its image data or image charge, the image data is read out by readout circuitry 236 through readout column bit lines 218 and then transferred to function logic 240. In one example, readout circuitry 236 may include an integrator coupled to each column C1 to Cx, which provides feedback through output lines 220 as shown. It is noted that the integrator coupled to each column C1 to Cx and each of the output lines 220 may be examples of integrator 122 and output line 120 of FIG. 1. Referring back to FIG. 2, in various examples, readout circuitry 236 may also include additional amplification circuitry, additional analog-to-digital (ADC) conversion circuitry, or otherwise. Function logic 240 may simply store the image data or even manipulate the image data by applying post image effects (e.g., crop, rotate, remove red eye, adjust brightness, adjust contrast, or otherwise). In one example, readout circuitry 236 may readout a row of image data at a time along readout column bit lines 218 (illustrated) or may readout the image data using a variety of other techniques (not illustrated), such as a serial readout or a full parallel readout of all pixels simultaneously.

In one example, control circuitry 238 is coupled to pixel array 202 to control operational characteristics of pixel array 202. For example, control circuitry 238 may generate a shutter signal for controlling image acquisition. In one example, the shutter signal is a global shutter signal for simultaneously enabling all pixels within pixel array 202 to simultaneously capture their respective image data during a single acquisition window. In another example, the shutter signal is a rolling shutter signal such that each row, column, or group of pixels is sequentially enabled during consecutive acquisition windows.

Figure 3:
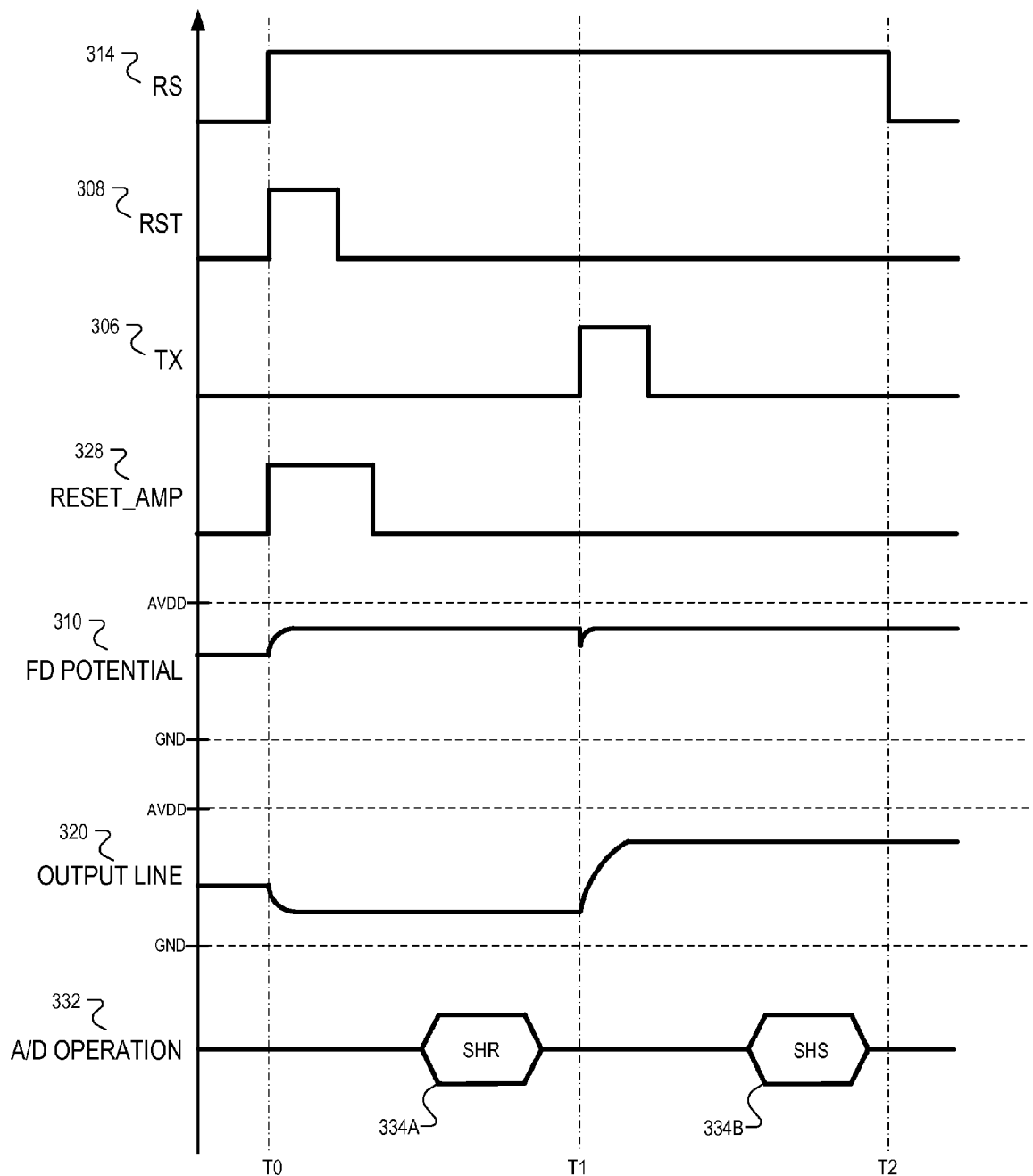
FIG. 3 illustrates a timing diagram of signals in an example readout architecture that suppresses potential swings at the floating diffusion nodes of a pixel array in accordance with the teachings of the present invention.

FIG. 3 illustrates a timing diagram of signals in an example readout architecture that suppresses potential swings at the floating diffusion nodes of a pixel array in accordance with the teachings of the present invention. It should be appreciated that the example signals illustrated in FIG. 3 illustrate various waveforms of signals associated with the example image sensor 100 shown in FIG. 1 and that similarly named and numbered elements below are coupled and function as described above. As shown in the example, a reset occurs at time T0. In the example depicted in FIG. 3, the row select signal RS 314, the reset signal RST 308, and the reset integrator signal RESET_AMP 328 are asserted during the reset. As such, the floating diffusion node voltage or potential 310 is set to a voltage close to the supply voltage AVDD and the voltage or potential on the output line 320 is set to a voltage near ground as shown. In one example, it is noted that the photosensitive device PD 104 may be reset separately prior to time T0 by asserting both the reset signal RST 308 and the transmit signal TX 306 to reset the image charge levels in the photosensitive element (not shown).

In one example, after the reset at T0 is complete, the reset signal RST 308, the reset integrator signal RESET_AMP 328, and the transmit signal TX 306 are de-asserted. As shown, the voltages at the floating diffusion potential 310 and the potential on the output line 320 have been reset as shown. In one example, at this time, an analog-to-digital operation 332 may occur and a first sampling of the level at output line 320 may be obtained with sample and hold circuit 134. In the illustrated example, the first sampling is indicated with the SHR 334A event, which indicates that a first sample has been obtained of the output signal level at the output line after the reset. During this time, the transfer signal TX 306 is de-asserted, and the photosensitive device PD 104 may also accumulate image charge.

At time T1, the transfer signal TX 306 is then asserted, and the image charge accumulated in the photosensitive device PD 104 is then transferred to the floating diffusion node FD 110. With the transfer of the image charge to the floating diffusion node FD 110, the potential on the floating diffusion node FD 110 begins to swing downward at time T1 as shown in FD potential 310. However, the downward swing that begins to occur in FD potential 310 at time T1 is detected by integrator 122 through bit line 118 and input capacitor $C_{IN}$ 126, which causes the output signal on output line 320 to rise as shown. As a result, the integrator 122 drives a positive voltage step on the output line 120, which supplies charge to the floating diffusion node FD 110 through the feedback coupling capacitor $C_{FB}$ 116, which suppresses the downward voltage swing on the floating diffusion node FD 110. Accordingly, the open loop gain of the op amp 124 is coupled to maintain a substantially constant voltage at the floating diffusion node FD 110 as shown.

During this time, after the transfer signal TX 306 has been de-asserted, another analog-to-digital operation 332 may occur and a second sampling of the output line 320 may occur with sample and hold circuit 134. In the illustrated example, the second sampling is indicated with the SHS 334B event, which indicates that a second sample has been obtained of the output signal value on the output line 320. In one example, the output value of the pixel may then be derived by finding the difference between the second sample and the first sample (i.e., output value=SHS−SHR).

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. An image sensor, comprising:
   a pixel array including a plurality of pixel cells, wherein each one of the plurality of pixel cells includes:
      a floating diffusion node;
      a photosensitive element coupled to selectively transfer image charge to the floating diffusion node; and
      a feedback coupling capacitor coupled between the floating diffusion node and an output line;
   a bit line coupled to selectively readout image data output from each one of a group of the plurality of pixel cells; and
   an integrator capacitively coupled to the bit line, wherein the integrator is coupled to output an output signal on the output line in response to the image data, wherein the output signal on the output line is capacitively coupled to the floating diffusion node through the feedback coupling capacitor to suppress a potential swing at the floating diffusion node of each one of the group of the plurality of pixel cells in response to the output signal, wherein the integrator comprises an op amp coupled as an integrator, and wherein the first input of the integrator comprises an inverting input of the op amp, wherein an open loop gain of the op amp is coupled to drive a positive voltage step on the output line to supply charge to the floating diffusion node through the feedback capacitor to maintain a voltage at the floating diffusion node above a voltage at the photosensitive element.

2. The image sensor of claim 1 wherein the group of the plurality of pixel cells includes a column of the pixel array.

3. The image sensor of claim 1 further comprising an input coupling capacitor coupled between a first input of the integrator and the bit line such that the bit line is capacitively coupled to the first input of the integrator.

4. The image sensor of claim 3 wherein the input coupling capacitor is coupled to support different DC voltage levels between the bit line and the first input of the integrator.

5. The image sensor of claim 1 further comprising a current source coupled between the inverting input of the op amp and a ground terminal, wherein the current source is coupled to sink current to the ground terminal.

6. The image sensor of claim 1 further comprising an analog to digital converter coupled to the output line to generate a digital signal in response to an analog signal on the output line.

7. The image sensor of claim 1 further comprising a sample and hold circuit coupled to the output line to sample and hold the output signal on the output line.

8. The image sensor of claim 7 wherein the sample and hold circuit is coupled to output a first sample of the output line after a reset, and wherein the sample and hold circuit is further coupled to output a second sample of the output line in response to the image data, wherein an output value of each one of the plurality of pixel cells is responsive to a difference between the second sample and the first sample.

9. The image sensor of claim 1 wherein each one of the plurality of pixel cells further includes a reset transistor coupled between the floating diffusion node and a supply voltage to selectively reset the image charge in the floating diffusion node and the photosensitive element.

10. The image sensor of claim 1 wherein each one of the plurality of pixel cells further includes a transfer transistor coupled between the photosensitive element and the floating diffusion node to selectively transfer the image charge to the floating diffusion node from the photosensitive element.

11. The image sensor of claim 1 wherein each one of the plurality of pixel cells further includes an amplifier coupled to the floating diffusion node to generate the image data in response to the image charge at the floating diffusion node.

12. The image sensor of claim 11 wherein each one of the plurality of pixel cells further includes a select transistor coupled between the amplifier and the bit line to selectively transfer the image data from the amplifier to the bit line.

13. An imaging system, comprising:
a pixel array including a plurality of pixel cells, wherein each one of the plurality of pixel cells includes:
a floating diffusion ("FD") node;
a photosensitive element coupled to selectively transfer image charge to the floating diffusion node; and
a feedback coupling capacitor coupled between the floating diffusion node and an output line;
control circuitry coupled to the pixel array to control operation of the pixel array; and readout circuitry including an integrator capacitively coupled to a bit line to selectively readout image data output from each one of a group of the plurality of pixel cells, wherein the integrator is coupled to output an output signal on the output line in response to the image data, wherein the output signal on the output line is capacitively coupled to the floating diffusion node through the feedback coupling capacitor to suppress a potential swing at the floating diffusion node of each one of the group of the plurality of pixel cells in response to the output signal, wherein the input coupling capacitor is coupled to support different DC voltage levels between the bit line and the input of the integrator, wherein the integrator is coupled to drive a positive voltage step on the output line to supply charge to the floating diffusion node through the feedback capacitor to maintain a voltage at the floating diffusion node above a voltage at the photosensitive element.

14. The imaging system of claim 13 wherein the group of the plurality of pixel cells includes a column of the pixel array, wherein the integrator is one of a plurality of integrators included in the readout circuitry.

15. The imaging system of claim 13 further comprising an input coupling capacitor coupled between an input of the integrator and the bit line such that the bit line is capacitively coupled to the input of the integrator.

16. The imaging system of claim 13 further comprising function logic coupled to the readout circuitry to store the image data readout from the plurality of pixel cells.

17. A method of operating an image sensor, the method comprising:
resetting a photosensitive element and a floating diffusion node in an image sensor pixel cell;
accumulating image charge in the photosensitive element;
transferring the image charge to the floating diffusion node from the photosensitive element;
generating image data on a bit line in response to the image charge at the floating diffusion node;
integrating the image data on the bit line with an integrator to generate an output signal on an output line of the integrator in response to the image data; and
suppressing a potential swing at the floating diffusion node with capacitive feedback coupling between the output line and the floating diffusion node, wherein suppressing the potential swing at the floating diffusion node with the capacitive feedback coupling between the output line and the floating diffusion node comprises driving a positive voltage step on the output line with the integrator to supply charge to the floating diffusion node through the feedback capacitor to maintain a voltage at the floating diffusion node above a voltage at the photosensitive element.

18. The method of claim 17 further comprising resetting the integrator while resetting the photosensitive element and the floating diffusion node in the image sensor pixel cell.

19. The method of claim 17 further comprising generating a first sample of the output signal on the output line after resetting the photosensitive element and the floating diffusion node in the image sensor pixel cell and prior to transferring the image charge to the floating diffusion node from the photosensitive element.

20. The method of claim 19 further comprising generating a second sample of the output signal on the output line after integrating the image data on the bit line with the integrator to generate the output signal on the output line of the integrator in response to the image data.

21. The method of claim 17 further comprising generating an output value in response to a difference between the second sample of the output signal and the first sample of the output signal.

22. The method of claim 17 further comprising converting an analog value of the output signal to a digital value of the output signal.

23. The method of claim 17 further comprising amplifying the image charge at the floating diffusion node with an amplifier transistor to generate the image data on the bit line.

24. The method of claim 17 further comprising supporting different DC voltages between the bit line and an input of the integrator with a capacitive coupling between the bit line and the input of the integrator.

\* \* \* \* \*